Nov. 8, 1949   E. H. RICHARDSON   2,487,729
SELF-LOADING GARBAGE VEHICLE
Filed Feb. 26, 1946   3 Sheets-Sheet 1
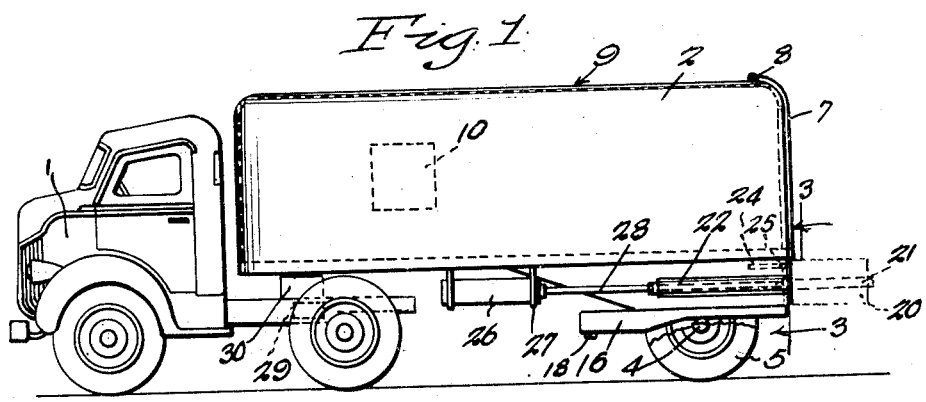
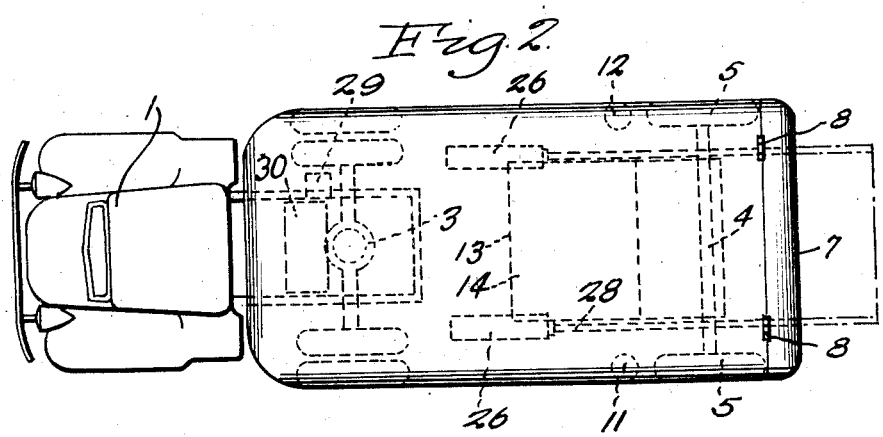
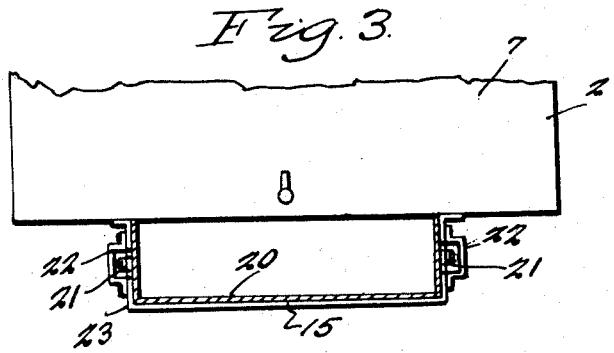
Inventor
Ewell Henry Richardson
By Clarence A. O'Brien
and Harvey B. Jacobson
Attorneys Nov. 8, 1949     E. H. RICHARDSON     2,487,729
SELF-LOADING GARBAGE VEHICLE
Filed Feb. 26, 1946     3 Sheets-Sheet 2
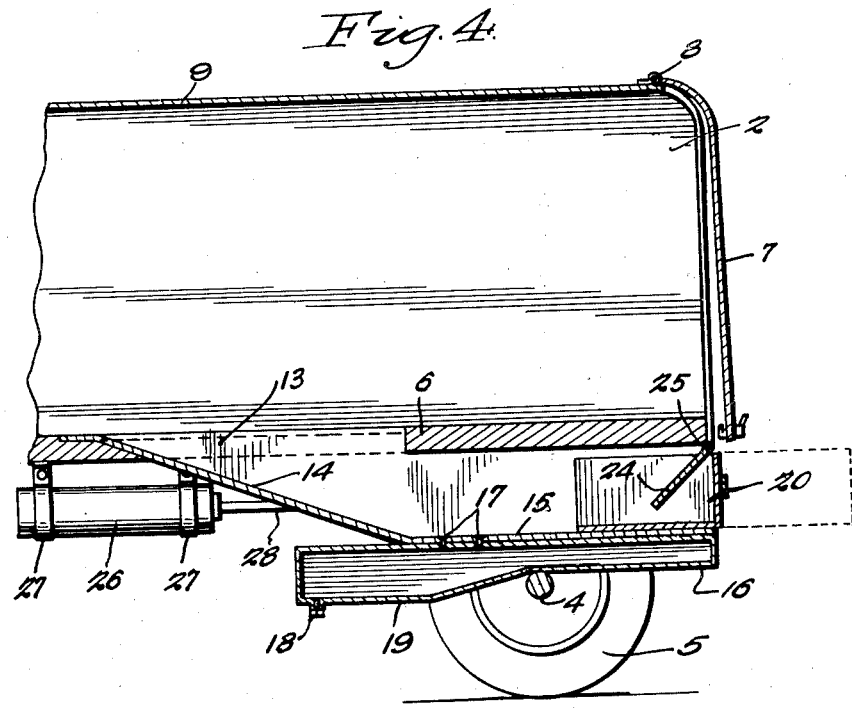
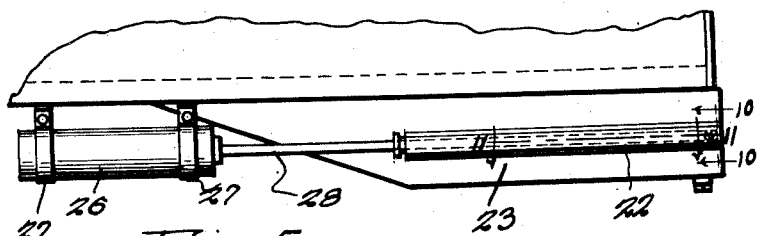
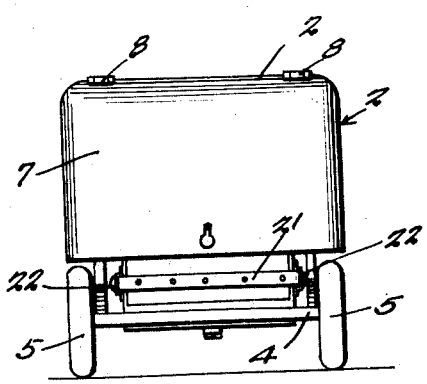
Inventor
Ewell Henry Richardson
By Clarence A. O'Brien
and Harvey B. Jacobson
Attorneys

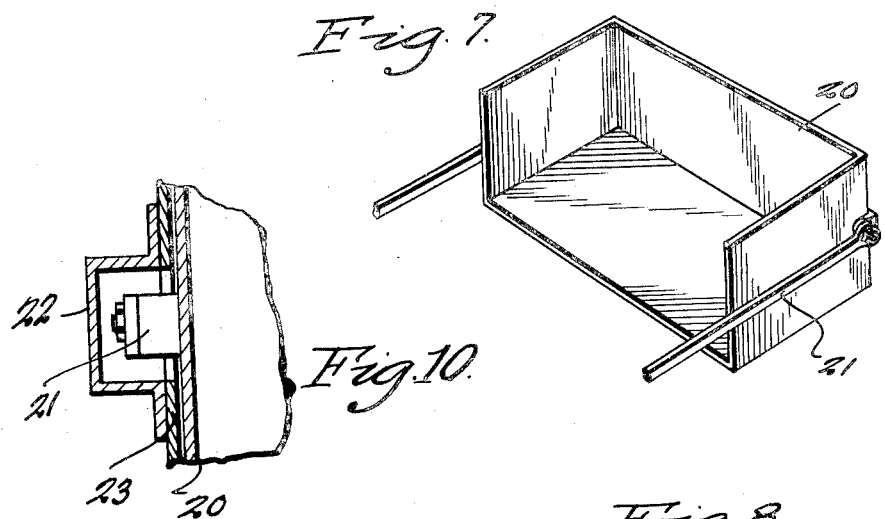
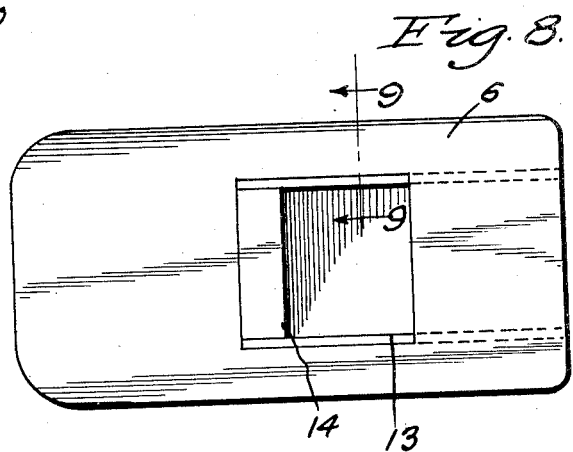
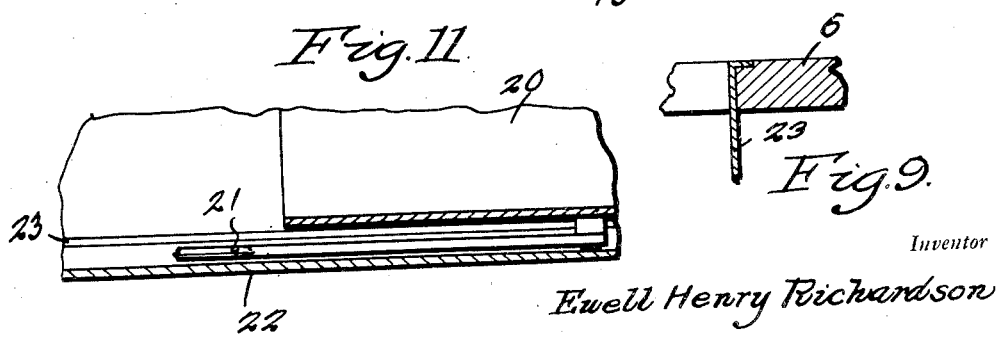

Patented Nov. 8, 1949

2,487,729

UNITED STATES PATENT OFFICE 2,487,729

SELF-LOADING GARBAGE VEHICLE

Euell Henry Richardson, Roanoke, Va.

Application February 26, 1946, Serial No. 650,215

5 Claims. (Cl. 214—83.3)

This invention relates to improvements in garbage collecting vehicles.

An object of the invention is to provide an improved self-loading garbage vehicle, which will be provided with fluid operated cylinders and pistons for forcing garbage placed in a loading hopper up through a loading duct into the body of the vehicle.

Another object of the invention is to provide an improved self-loading garbage vehicle with power-operated means for forcing garbage placed in a loading hopper up through a loading duct in the floor of the vehicle and into the vehicle body, with added means for preventing the garbage from falling back into the loading hopper as it is brought back to its extended position to receive additional garbage.

A further object of the invention is to provide an improved self-loading garbage vehicle which will include power-operated means for loading garbage placed in a loading hopper into the vehicle body, and means to collect drainage from the garbage.

A stil further object of the invention is to provide an improved self-loading garbage vehicle which will be highly efficient in operation, and relatively inexpensive to manufacture and produce.

Other objects will appear as the description proceeds.

In the accompanying drawings which form a part of this application,

Figure 1 is a side elevation of the improved self-loading garbage vehicle;

Figure 2 is a plan view of the improved self-loading garbage vehicle;

Figure 3 is a sectional view taken on the line 3—3 of Figure 1;

Figure 4 is a vertical sectional view through the rear portion of the garbage vehicle showing the self-loading mechanism;

Figure 5 is a side elevation of one of the fluid operated cylinders and pistons showing the track way upon which the loading hopper reciprocates;

Figure 6 is a rear view of the improved self-loading garbage vehicle;

Figure 7 is a perspective view of the garbage loading hopper;

Figure 8 is a plan view of the body bed showing the loading duct;

Figure 9 is a sectional view taken on the line 9—9 of Figure 8;

Figure 10 is a sectional view on the line 10—10 of Figure 5, and

Figure 11 is a horizontal sectional view on line 11—11 of Figure 5.

Like characters of reference are used throughout the following specification and the accompanying drawings to designate corresponding parts.

In carrying out the invention, there is provided an improved garbage collecting vehicle having a tractor 1 for drawing the same, and a body 2 secured at its forward end to the rear of the tractor upon the saddle 3, said body being supported at its rear end upon the axle 4 and rear wheels 5.

The body 2 of the vehicle is provided with a floor 6, and with a tail gate 7 hinged at its upper end as at 8, to the top 9 of the vehicle body 2. An inspection door 10 will be suitably supported in the side of the vehicle body 2.

Standard body hoists 11 and 12 are indicated in Figure 2 of the drawings, and are used to tilt or elevate the body 2 to empty the garbage from the rear of the body when the tail gate 7 is opened.

A loading opening or duct 13 is formed through the floor 6 of the body 2, and an inclined garbage loading ramp 14 is secured at its forward end to the floor 6 and extends flush therewith, while its rear end is flattened out as at 15 and extends to the rear of the body 2. The ramp 14 is preferably formed of metal, and is located centrally of the floor and does not extend the full width of said floor.

An elongated metal drainage tank 16 is suitably secured to and supported by the ramp plate 15, preferably by welding and is formed with a plurality of drain openings 17 extending through said plate and the top of the tank, whereby drainage from the garbage may pass through said openings and be collected in the tank. A drain plug 18 will close a drain opening in the bottom of the sump portion 19 of the tank 16.

A garbage loading hopper 20 is slidably received in the loading duct, and is supported on the loading yoke 21 extending across its rear end and forwardly along its opposite sides, said yoke 21 being supported by the carrier bars 22 secured to the opposite side walls 23 of the said loading duct, whereby the loading hopper 20 may pass into and out of the loading duct.

A baffle plate 24 is hinged to the rear end of the floor 6 of the body 2 at 25, and swings inwardly when the loading hopper is forced into the loading duct, and swings back into vertical position when the hopper 20 is moved to its extended position to receive more garbage, thus preventing the garbage from dropping back out of the body as it is being loaded.

Fluid operated cylinders 26 are positioned longitudinally of the bottom 6 of the body 2, and are supported by the brackets or element 27. Said cylinders 26 are adapted to receive pistons (not shown) and interconnected piston rods 28 which are secured to the forward ends of the said loading yoke.

An oil pump 29 is provided and is suitably connected with the cylinders 26 for admitting oil thereto to move the loading hopper outwardly to receive garbage, and to move the hopper inwardly through the loading duct to compress the garbage therein and up into the vehicle body 2. A reserve oil tank 30 is provided so that sufficient oil may be had at all times to operate the loading mechanism.

Suitable controls (not shown) will be located in the tractor cab for operating the cylinders and pistons, and also for operating the standard body hoists 11 and 12 when the contents of the body 2 is to be dumped.

From the foregoing description it will be apparent that there has been provided a highly efficient form of garbage collecting vehicle, which will be self-loading, and will do away with practically all of the messiness usually accompanying the collection of garbage.

The preferred embodiment of the invention has been illustrated and described, but it will be understood that it is not intended to limit the scope of the invention thereto, as many minor changes in detail of construction may be resorted to without departure from the spirit of the invention.

Having thus described my invention what I claim as new and desire to secure by Letters Patent of the United States is:

1. A self-loading garbage vehicle including a wheel supported body having a floor, a loading duct supported below and exteriorly of said floor and extending therethrough, a garbage loading hopper reciprocably and slidably mounted in said duct, means for reciprocably operating the hopper in said duct, a drainage collecting tank disposed below said loading duct and supported thereby and means swingably disposed at the rear of the duct for preventing retrocession of the garbage loaded in the duct upon movement of the hopper exteriorly of the duct.

2. A self-loading garbage vehicle including a wheel supported body having a floor, a loading duct supported below and exteriorly of said floor and extending therethrough, a hinged baffle plate at the rear of said duct, a garbage loading hopper slidable in said duct, a drainage collecting tank disposed below said loading duct and supported thereby and formed with drain openings extending through said duct into said tank, and means for reciprocably operating the hopper in said duct to by-pass said baffle plate on each forward and rearward movement thereof.

3. A self-loading garbage vehicle including a wheel supported body having a floor, a loading duct supported below and exteriorly of said floor and communicated with the body, a loading hopper slidably mounted within said duct, a baffle plate hinged at the rear of said duct and actuated by said hopper as it passes into said duct, and means for reciprocably operating the hopper in said duct said means including a yoke secured to said hopper, cylinder carried piston rods operatively secured to said yoke.

4. The combination of claim 1, wherein said last-mentioned means includes a baffle plate hinged to the duct adjacent the rear end thereof, said baffle plate being movable inwardly of the duct upon engagement of the hopper.

5. A self-loading garbage vehicle comprising a wheel supported body having a floor, a loading duct supported below and exteriorly of said floor and communicated with the body, a garbage loading hopper, having a forward open end, slidably mounted in said duct, an operating yoke secured around said hopper, hydraulic cylinders operatively associated with said yoke for reciprocably operating the hopper in said duct, a baffle plate hinged at the rear of the duct for movement into duct upon engagement of the hopper, a drainage collecting tank disposed below said loading duct and supported thereby and formed with drain openings extending through said duct into said tank.

EUELL HENRY RICHARDSON.

REFERENCES CITED

The following references are of record in the file of this patent:

UNITED STATES PATENTS

| Number | Name | Date |
|---|---|---|
| 771,936 | Rifenberick | Oct. 11, 1904 |
| 1,182,369 | Haniquet | May 9, 1916 |
| 1,991,297 | Schluter | Feb. 12, 1935 |
| 1,996,945 | Ballert | Apr. 9, 1935 |
| 2,050,806 | Rey | Aug. 11, 1936 |
| 2,212,058 | Wood | Aug. 20, 1940 |
| 2,252,608 | Ballert | Aug. 12, 1941 |

FOREIGN PATENTS

| Number | Country | Date |
|---|---|---|
| 823,519 | France | Oct. 18, 1937 |
| 649,350 | Germany | Aug. 26, 1937 |
| 176,275 | Switzerland | July 1, 1935 |